United States Patent
Sussman

(10) Patent No.: US 7,140,535 B2
(45) Date of Patent: Nov. 28, 2006

(54) METHOD AND SYSTEM TO VALIDATE PERIODICALLY THE VISA OF A FOREIGN VISITOR DURING THE VISITOR'S IN-COUNTRY STAY

(76) Inventor: Lester Sussman, 9213 Bulls Run Pkwy., Bethesda, MD (US) 20817-2403

( * ) Notice: Subject to any disclaimer, the term of this patent is extended or adjusted under 35 U.S.C. 154(b) by 314 days.

(21) Appl. No.: 10/771,008

(22) Filed: Feb. 4, 2004

(65) Prior Publication Data

US 2005/0180570 A1 Aug. 18, 2005

(51) Int. Cl.
*G06F 17/00* (2006.01)
*G06K 5/00* (2006.01)

(52) U.S. Cl. .................. 235/375; 235/382

(58) Field of Classification Search .......... 235/375, 235/487, 492
See application file for complete search history.

(56) References Cited

U.S. PATENT DOCUMENTS

| | | | | |
|---|---|---|---|---|
| 6,111,506 A | * | 8/2000 | Yap et al. .......... | 340/572.1 |
| 2004/0099731 A1 | * | 5/2004 | Olenick et al. ..... | 235/380 |
| 2005/0039014 A1 | * | 2/2005 | Sajkowsky ......... | 713/172 |
| 2005/0072849 A1 | * | 4/2005 | Jones ............... | 235/487 |
| 2005/0167484 A1 | * | 8/2005 | Sussman ............ | 235/380 |

OTHER PUBLICATIONS

Ellen Groves, "To Make a Quick I.D., Play it by Ear", Apr. 12, 2004, p. 92, Businessweek, USA.
Panko, "Basic Error Rates", 1997, pp. 1-3, http://panko.cba.hawaii.edu/HumanErr/Basic.htm, USA.
USA Nonimmigrant Visa Application, DS-156, pp. 1-2, U.S. Dept. of State, Feb. 2003, USA.
Transaction Team 1500 Brochure, Oct. 2002, pp. 1-2, HHP, USA.
Issues & Elements of Credit Card Receipt & Signature Management, pp. 1-6, 17, ING@NICO, USA.
Bruce Schneier, One-Way Hash Functions (Chap. 18), Applied Cryptography (2ed.), 1996, pp. 429-431, John Wiley & Sons, Inc.
Bruce Schneier, Public-Key Algorithms (Chap. 19), Applied Cryptography (2ed.), 1996, pp. 461-462 and 466-474, John Wiley & Sons, Inc.
Dept. of Homeland Security, US-VISIT pamphlet, pp. 1-3.
Athena Smartcard Solutions Inc., ASECard Crypto, 2 pages.
Athena Smartcard Solutions Inc., ASEDrive IIIe PC/SC Smart Card Readers, 2 pages.
Allsafe Technologies, Magnetic Stripe, 1 page, Amherst, New York.
Tyner, Manual Swipe Magentic Card Low-Co Reader/Writer RS-232 Interface Details, MSR 106 Series Reader/Writer, 3 pages.

* cited by examiner

*Primary Examiner*—Daniel Stcyr

(57) ABSTRACT

This invention integrates with a country's customs and immigration system to keep a periodic check on visitors within the country's borders. A smartcard is created and issued to the visitor at the visitor's Port of Entry. Pertinent immigration information is embedded in the smartcard. Cryptographic technology is used with the smartcard to maintain privacy, as well as to reduce fraud and other misuse. The smartcard is used as the visitor's official identification document whilst in the country. During the visitor's stay, at specified intervals, the visitor registers with automated kiosks (i.e. a Visitor-Visa Automated Teller Machines—ATMs), which are placed at various locations within the country. The ATM kiosks are securely integrated with the customs and immigration database. On exiting the country, the smartcard is returned and is recycled with a new visitor.

20 Claims, 3 Drawing Sheets

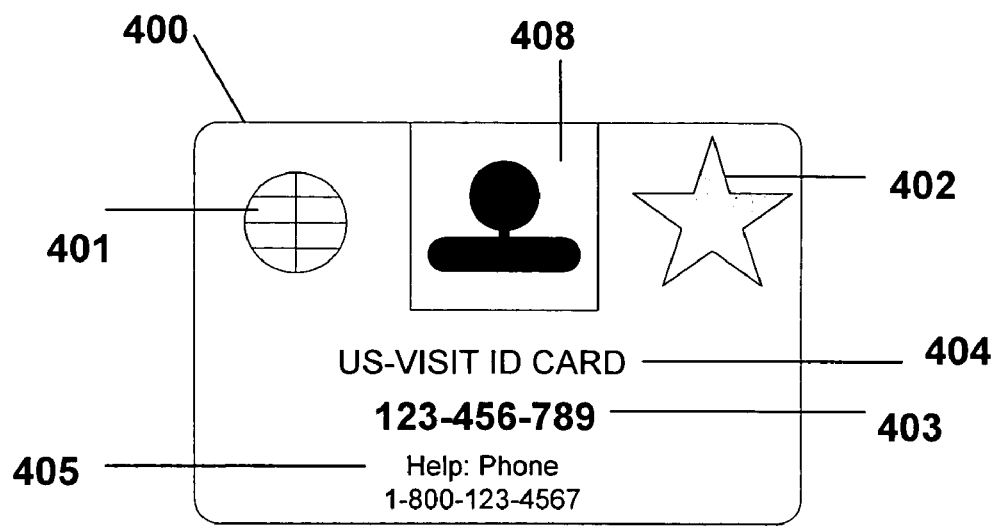
Fig. 3A  Card Front face
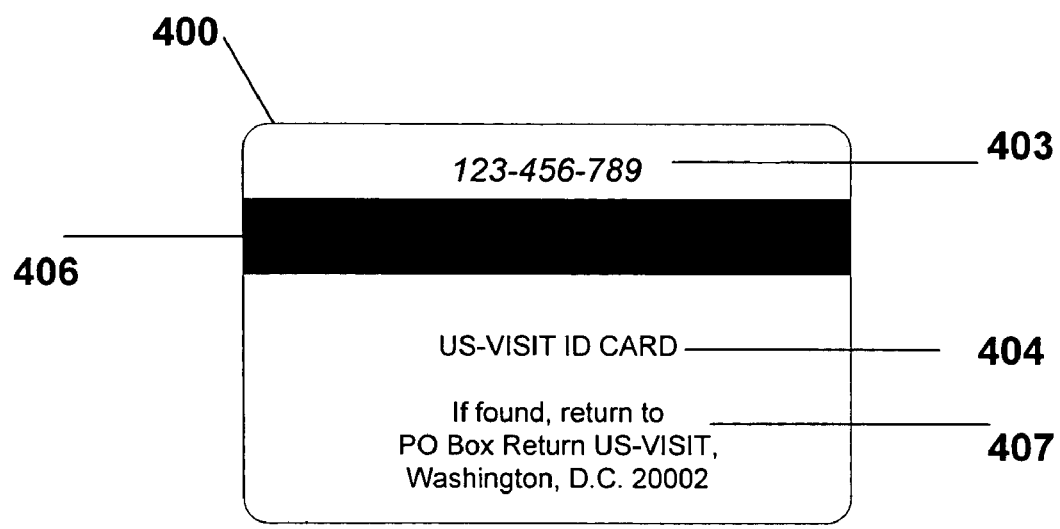
Fig. 3B  Card Rear face

METHOD AND SYSTEM TO VALIDATE PERIODICALLY THE VISA OF A FOREIGN VISITOR DURING THE VISITOR'S IN-COUNTRY STAY

TECHNICAL FIELD

This invention relates to automated teller machines and smartcards, specifically, this invention relates to an automated teller machine that is periodically used to validate a foreign visitor's authorized stay within a country, each visitor having been issued with a personal smartcard at the port of entry.

BACKGROUND OF THE INVENTION

In January 2004, the US Department of Homeland Security (DHS) implemented a new system at 115 airports and 14 seaports, which is designed to confirm the identity of arriving foreign visitors. The new system is called the US-VISIT program, i.e. the United States Visitor and Immigrant Status Indicator Technology. Further information on the US-VISIT program can be found at www.dhs.gov/interweb/assetlibrary/USVisitRegulation1-5-04.pdf.

Today the primary focus of US-VISIT is on entry. By the end of 2005, it is planned that entrance and exit procedures will be phased in at all border entrances in the US. Currently 30 airports implement the exit portion of the program.

The US-VISIT uses scanning equipment to collect biometric identifiers, specifically digital fingerprints and digital photos of a person's face.

Data collected from foreign visitors is securely stored as part of a visitor's travel record. Upon exiting the US, visitors check out at kiosks by scanning their passport or visa and repeating the fingerprint scan.

The stored information will be available to authorized officials and law enforcement agencies and will help verify compliance with visa and immigration policies. The information, e.g. the scanned fingerprints, will be checked against a database of known and suspected terrorists and other undesirables.

A potential problem arises when a visitor overstays his visa. In the current system, this overstay will be caught if he exits the country. It is possible that a warrant for his arrest could be issued because the central database has detected an overstay. The problem is then locating the individual. The majority of visitor visas are issued for a period of six months. Within six months, it is possible for a visitor to fraudulently change his identity. The invention proposes to close many of these loop holes.

SUMMARY OF THE INVENTION

The invention integrates with a country's customs and immigration system to periodically validate a visitor's authorized stay within the country's borders. This periodic check includes:

The creation and issuing of a smartcard during the visitor's Port of Entry processing visit with pertinent immigration information embedded in the smartcard.

Storing an original copy of the visitor's immigration (or non-immigration) information in a central database system—information, that was embedded on the visitor's smartcard.

Use of cryptographic technology with the smartcard to reduce fraud and other misuse.

A self-service, automated kiosk/terminal, i.e. a Visitor-Visa Automated Teller Machine (ATM) with which the visitor periodically interacts (i.e. checks in) and which is distributed at various locations within the country.

Integration of an ATM terminal with the customs and immigration database.

The visitor's check in periodicity depends upon visitor's visa type and length of stay in the country.

BRIEF DESCRIPTION OF THE DRAWINGS

FIG. 3A is a schematic of the front face of the invention's smartcard.

FIG. 3B is a schematic of the rear face of the invention's smartcard.

DETAILED DESCRIPTION OF THE INVENTION

Figure 1:
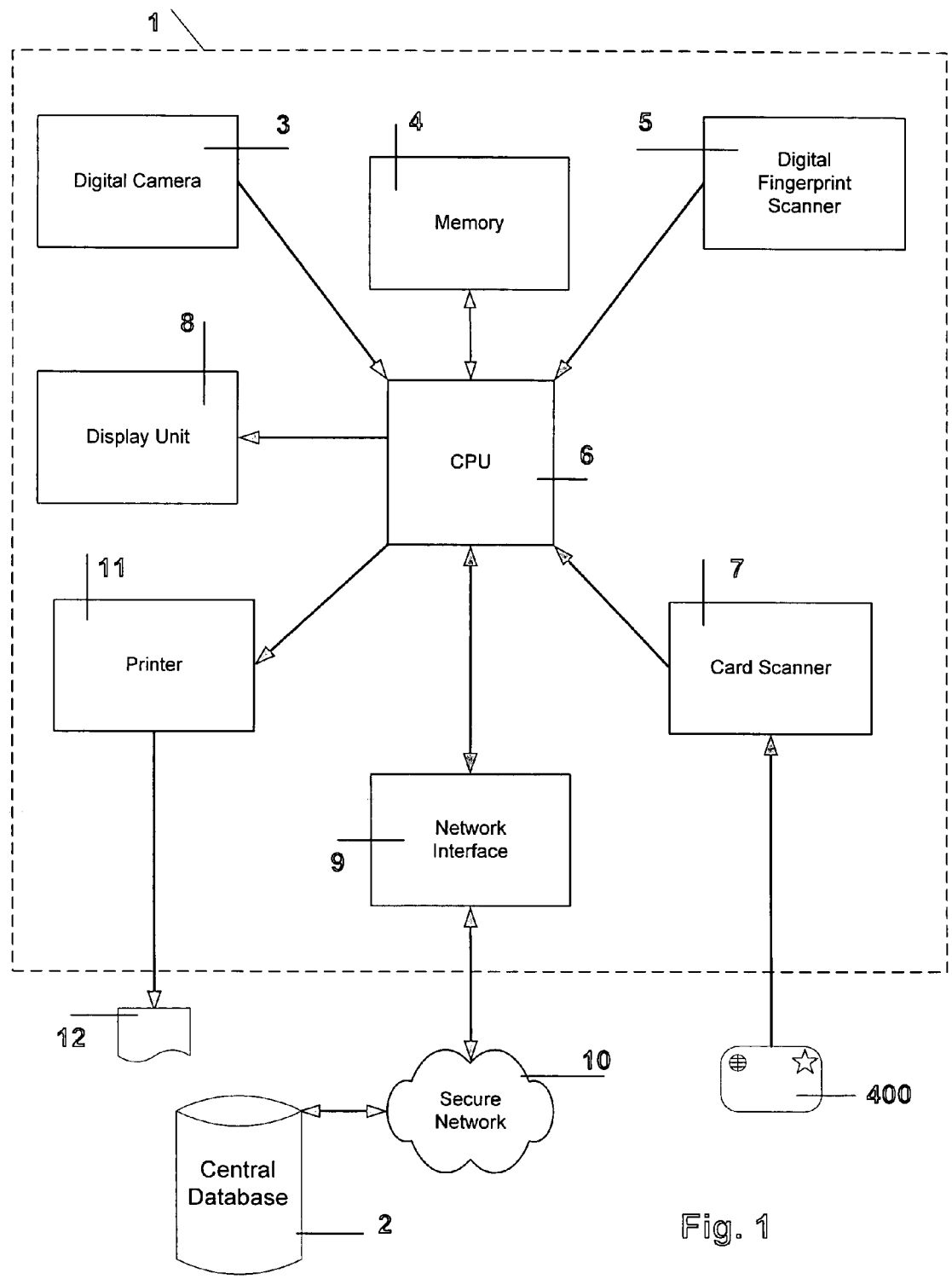
FIG. 1 is a block diagram of the various components of the present invention's embodiment of a Visitor-Visa Automated Teller Machine.

Before continuing to describe the invention in more detail, we first consider a quick overview of available cryptography.

1) Cryptography for Verification, Integrity and Confidentiality

Two key cryptographic technologies that the preferred embodiment of the invention uses are public key and conventional cryptography to ensure three things:

(1.1) To verify the integrity of the Visitor-Visa ATM 1, (1.2) Confidentiality of the data transmitted between the ATM 1 and the central database 2 and (1.3) That the data has not been altered during either transmission between the ATM 1 and the central database 2, as well as not being altered whilst stored on the smartcard 400.

Conventional cryptography is also called secret key or symmetric key cryptography. The Data Encryption Standard (DES), Triple Des and Message Digest 5 (MD5) are examples of symmetric key cryptography.

Message digests are the representation of alphanumeric text in the form of a single string of digits, created using a one-way hash function. Encrypting a message digest with a private key creates a digital signature, which is an electronic means of authentication.

Use of secret keys to encrypt data is much faster than public key encryption, but the problem of using symmetric keys is the safe distribution of the keys between transaction partners, e.g. from a central office to remote offices where the Visitor-Visa ATM 1 is stationed. This key distribution is solved using public key cryptography.

Public key cryptography is an asymmetric method that uses a pair of keys for encryption: a public key that encrypts data and a private key (i.e. secret key) that decrypts the data. The public key is openly distributed. The key's owner keeps the private key secret. The secret key cannot readily be derived from the public key. Furthermore, if the key owner digitally signed the data using his private key, then the signature can be verified using the key owner's openly distributed public key.

The present invention uses cryptography to digitally sign the information stored on the smartcard 400. Public key cryptography (i.e. Public Key Infrastructure or PKI) is used to communicate between a central office and the remotely located ATM 1 machines.

A Digital Certificate is an attachment to an electronic message used for security purposes. The most common use of a digital certificate is to verify that a user sending a message is who she claims to be, and to provide the receiver with the means to encode a reply. An individual wishing to send an encrypted message applies for a digital certificate from a Certificate Authority (CA). The CA issues an encrypted digital certificate containing the applicant's public key and a variety of other identification information. Note that in the preferred embodiment of the invention, the CA would most probably be an issuing authority within the government. The CA, in the preferred embodiment of the invention, makes its own public key readily available via distribution on a secure network. The recipient of an encrypted message uses the CA's public key to decode the digital certificate attached to the message, verifies it as issued by the CA and then obtains the sender's public key and identification information held within the certificate. With this information, the recipient can send an encrypted reply. The most widely used standard for digital certificates is X.509.

Various implementations of cryptography are used in the invention's preferred embodiment, such as Netscape's Secure Socket Layer (SSL), the IETF's OpenPGP, the Message Digest 5 (MD5), etc.

Note that because this invention would be used by the government, any cryptographic standards that the government uses would be implemented in the invention. In the US, the National Institute of Standards and Technology lists government standards for smartcards on a web site at smartcard.nist.gov. The Government Smart Card-Interoperability Specification is freely available from this web as the "NIST Interagency Report 6887-2003 edition Version 2.1".

The invention's embodiment relies on cryptography as described in further detail in the book titled "Applied Cryptography" (second edition), by Bruce Schneier.

We now consider the various hardware components of the invention before we discuss the process of the invention and its use of various components.

2. Visitor-Visa Card

The present invention includes the creation of an identity card, i.e. the Visitor-Visa card 400 (see FIG. 3A and FIG. 3B).

FIG. 3A depicts the front view of the Visitor-Visa card 400. This card 400 becomes an ID card for the visitor during the visitor's in-country stay. The card 400 includes the following features:

(2.1) The card 400 format is similar to a credit card issued by various banks, etc. The primary reason for this is so that it can fit easily in a visitor's purse, wallet, etc. Furthermore, the person is more likely to securely store the card 400, whilst it's in his possession.

(2.2) A unique identification number 403 is embossed on the front of the card 400 (see FIG. 3A), as well as on the rear of the card (see FIG. 3B). This card identification number 403 is associated with the visitor's database 2 record. Technically, it is set up as an alternate database record key, i.e. the visitor's database record can be accessed by using this identifier 403.

(2.3) A card logo 402 is present on the front face of the card to provide easy identification of the card type, i.e. versus a person's credit card, etc. This logo can also be implemented as an anti-fraud measure, e.g. using a hologram picture, etc.

(2.4) Further card type identification information is provided on the card 400, namely specific card type text 404. In FIG. 3A, the example given is "US-VISIT CARD ID". This information is available on both sides of the card 400. This information can be embossed, or printed on the card 400.

(2.5) If the visitor requires assistance, e.g. locating a Visitor-Visa ATM 1 machine (more about this later) as depicted in the "Locate Visitor-Visa ATM in City", block 22 in FIG. 2, the visitor can call the number listed on the Help line 405, which is listed on the front of the card 400.

(2.6) The preferred embodiment of the invention includes a smart integrated circuit, i.e. a smart-chip 401 on the card 400. This smart-chip 401 is similar to the technology used in today's smartcards. An example of a smartcard is the ASECard Crypto from Athena. This smartcard provides Public Key Infrastructure (PKI) encryption technology to data stored on the card. The invention uses the smart-chip 401 to store information about the visitor, using encryption technology to reduce the potential for fraudulent abuse of the card 400. The ASECard Crypto has up to 3 KB of non-volatile RAM to store information. As is common with integrated circuit technology, the size of memory will increase over time, and hence more data will be able to be stored in the smart-chip's memory.

(2.7) The visitor's photo 408 is printed directly onto the front face of the card 400.

(2.8) Use of the smart-chip 401 on the card 400 could be replaced by using a magnetic stripe 406, for example, on the rear face of the card (see FIG. 3B), as is used by today's credit cards, etc. Standard technology on today's magnetic stripe cards has three tracks on which data can be encoded. The first track allows seventy-nine (79) alphanumeric characters to be encoded, the second track allows forty (40) numeric characters to be encoded, and the third track allows one hundred and seven (107) numeric characters to be encoded. As can be seen, the smart-chip 401 allows more data storage on the card 400 than a magnetic strip 406.

(2.9) The rear face of the card 400 (see FIG. 3B) also includes information 407 that can be used to return the card 400 if it is lost by a visitor and found by another person.

3. Visitor-Visa Automated Teller Machine (ATM)

FIG. 1 depicts a block diagram of the various components of the invention's Visitor-Visa ATM 1. The Visitor-Visa ATM 1 is similar to the various ATMs that banks provide their customers. The invention's Visitor-Visa ATM 1, includes the following components:

(3.1) A digital camera 3 that is used to verify the identity of the person using the ATM machine 1. The resolution (i.e. dpi) of this camera 3 is similar to the resolution of the digital camera used to photograph the visitor at the Port of Entry. This is important in order to compare the original digital image with the ATM 1 captured digital image.

(3.2) Memory 4 to store both programs that control the ATM 1, as well as memory to process data received via the various interfaces of the Visitor-Visa ATM 1.

(3.3) A digital fingerprint scanner (i.e. reader) 5 that is used to scan in (i.e. read) the fingerprint to verify the identity of the person using the ATM 1. The resolution (i.e. dpi) of this fingerprint scanner 5 is similar to the resolution of the digital fingerprint scanner used to scan the visitor at the Port of Entry. This is important in order to compare the original digital image with the ATM 1 captured digital image.

(3.4) A processing unit, i.e. a CPU 6 that controls all the various electronic components of the Visitor-Visa ATM 1. Note that the Visitor-Visa ATM 1 could be simply implemented as a standard computer, e.g. a MS-Windows, or Linux PC, or any other available computer system.

(3.5) A card scanner (i.e. reader) 7 that scans (i.e. reads) the Visitor-Visa card 400 that was initialized during the "Initialization At Port of Entry" 20 process. The card scanner 7 is able to read information stored in either the card's magnetic stripe 406, and/or the card's smart-chip 401.

(3.6) A display unit 8 (e.g. a computer screen) on which to display messages for the visitor. The preferred embodiment of the invention uses a touch-screen display. The display 8 is also used to display an interactive keyboard if information is required to be entered by the visitor.

(3.7) A network interface 9 is provided so that the Visitor-Visa ATM 1 can interact over a secure network 10 with the central database 2. The secure network 10 can be implemented as a private network (e.g. via X.25, dedicated telecommunication lines, satellite VSAT network, a wireless network, etc.), a virtual private network over the Internet, etc.

(3.8) A printer 11 is available to print any messages, directions, and other information out on a piece of paper 12 for the visitor to take away with him.

Other components not shown in FIG. 1 include a visible marker (e.g. markers in the shape of footprints) on the ground on which the visitor is to stand in order to be within the focal length of the digital camera 3. Although not used in the preferred embodiment, it is possible to include a component in the Visitor-Visa ATM 1 that can electronically measure the height and/or weight of the visitor and process the information accordingly.

Each Visitor-Visa ATM 1 has a unique Digital Certificate embedded in its memory 4 (not depicted in FIG. 1). This certificate is used to uniquely identify the ATM 1, used in secure communications with the central database 2 (e.g. via SSL), as well as being used to encode any information for transmission. The digital certificate is used similarly as a digital certificate is used in electronic commerce (e-commerce) on the Internet today.

Furthermore, the public-key that was used to issue the smartcard 400 at the Port of Entry is stored in memory 4 as well. This public-key (or set of public keys from various Ports of Entry, each with their own unique public key) is used to verify the digital signature stored on the smartcard 400.

4. Visitor-Visa Process 4.1) Initialization at Port of Entry—Block 20 in FIG. 2

Figure 2:
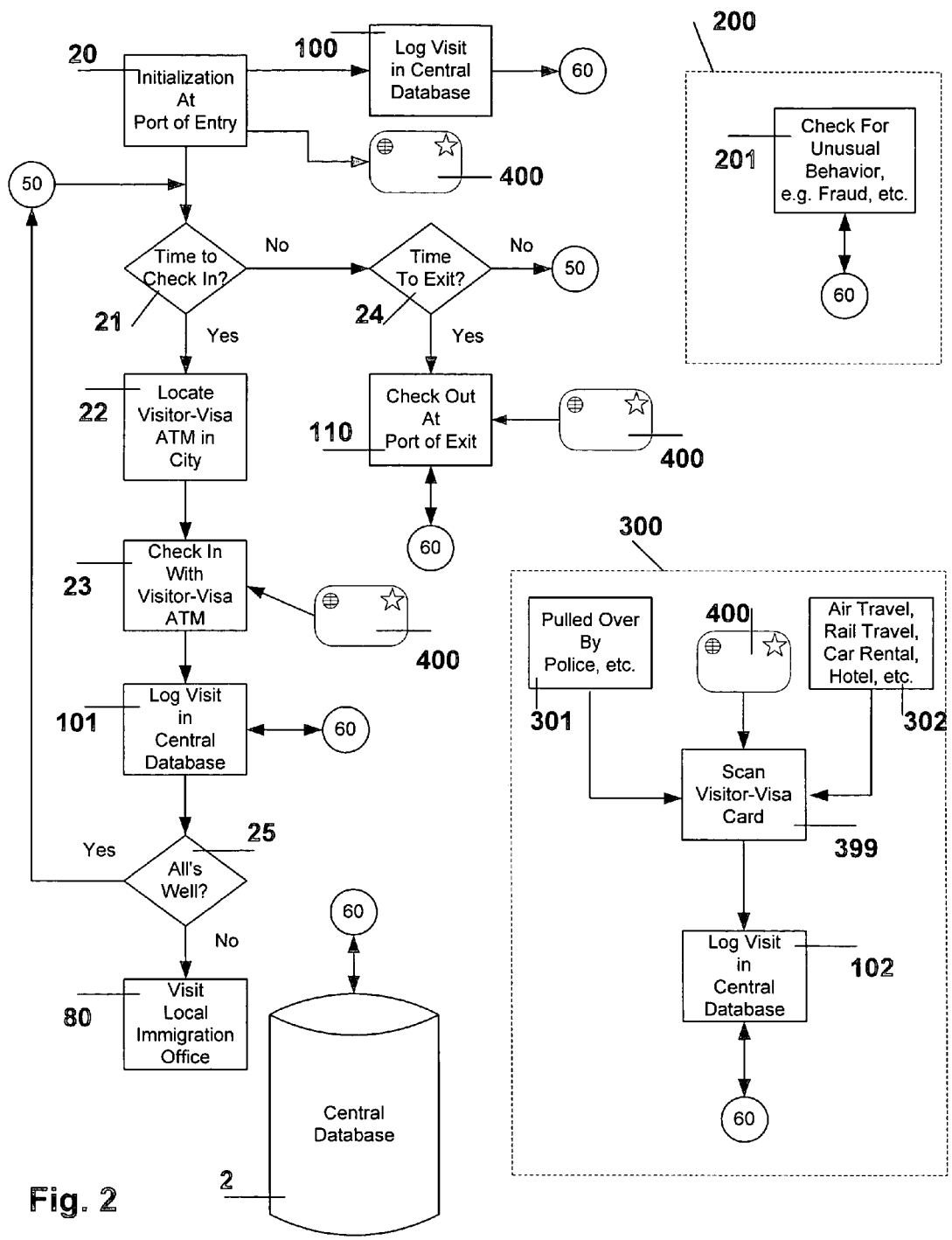
FIG. 2 is a flow chart of the various processes embodied by the present invention.

In FIG. 2, a flow chart depicts the process of the current invention. The process starts with the "Initialization At Port of Entry", block 20 in FIG. 2.

This initial step (i.e. visitor registration) in the process includes the digital photographing and fingerprinting of the visitor. The information is gathered by various customs and immigration personnel at the Port of Entry, using a computer/workstation. This information is stored 100 by each computer/workstation in a central database 2, which is remotely located from each of the computers/workstations. The central database 2 is securely networked to each of the computers/workstations. The central database 2 is controlled by a server computer (not shown in diagrams), and a variety of software running on the server.

At this time, the invention creates the visitor's Visitor-Visa Card 400. The purpose of the Visitor-Visa Card 400 is similar to the use of a state driver's license in the US, i.e. a means of identification. Today the visitor primarily has his passport as a means of identification.

In the preferred embodiment of the invention, the visitor's photo 408 is directly printed onto the front face of the card 400. This makes the card 400 representative of a foreign visitor's in-country id document. Note that it is possible to embed the visitor's date of entry (see Table 1, item [2]) in the photo. This feature would help simplify the visual validation of the visitor's authorized stay in the country.

Table 1 illustrates the data stored on this card 400, when using the smart-chip 401. This information is also stored (see "Log Visit in Central Database", block 100 in FIG. 2, via the on-page connector "60") in the central database 2.

TABLE 1

| Visitor's Information | Description |
| --- | --- |
| 1) Last Name, Middle Initial[s], First Name | Visitor's full name. |
| 2) Date of Entry | Date (e.g., MM/DD/YY) on which the card was created and issued at the Port of Entry. |
| 3) Visitor-Visa Card Number | This unique identification number 403 is embossed on the front of the card 400, as well as on the rear of the card (see FIG. 3B). This card identification number 403 is associated with the visitor's database 2 record. This number is also stored on the card's smart-chip 401 memory and/or magnetic stripe 406. |
| 4) Length of Stay | Authorized length of stay in country. For example, a B2 visa could have a six-month stay. |
| 5) Visa Type | Visa classification, e.g. B2, H1-B, J1, M1, etc. This data could be encrypted to be used only by authorized personnel. |
| 6) Digital Photo | Copy of digital photo. |
| 7) Height | Self-explanatory. |
| 8) Color of Eyes | Self-explanatory. |
| 9) Color of Hair | Self-explanatory. |
| 10) Language(s) | Visitor's language of preference, as well as others that the visitor understands. This language will be used on the display unit 8 of the ATM 1 when the visitor interacts. |
| 11) Other Data | Other data needed for the visa checking process, e.g. Port of Entry code, Country of Origin, Residential Address, Residential Phone Number, visitor's weight, etc. |
| 12) Digital Fingerprint (encrypted) | Copy of scanned digital fingerprint. Encrypted to be used only by authorized personnel. |
| 13) Digital Signature | Digital signature of the above information (e.g., [1] to [11]) to prevent fraudulent change of information. |

Other information could also be gathered at this time, e.g. the person's weight could be entered by having the visitor unobtrusively be standing on a weight scale when being fingerprinted, etc. This information would be stored in the central database 2, i.e. in Table 1, "Other Data".

Referring to Table 1, some of the information is encrypted to prevent unauthorized viewing of the specific information. The invention does not prevent the encrypting of other, or all of the information. The primary purpose of the card 400 is for use of the identification of the visitor, as well as ensuring that the visitor does not overstay his visit in the country.

The primary reason that most of the information is not encrypted is so that the Visitor-Visa card 400 can be used as an in-country identification document for the visitor.

In the case where the smart-chip 401 is not used, e.g. because of implementation costs, etc., then the magnetic stripe 406 would be used. Unfortunately, today the magnetic strip 406 cannot store all of the information as described in Table 1 (see section "1] Visitor-Visa Card", sub-section [1.7]). In this case, only the Visitor-Visa Card Number (Table 1, item [3]) and the Digital Signature (Table 1, item [12]) is stored in the magnetic stripe 406. Note that the Digital Signature is created at the Port of Entry based on all of the pertinent information depicted in Table 1, which could be stored in a smart-chip 401, if one was used. Later for validation purposes, the Digital Signature is centrally validated against the original data.

The actual location of where the card's data is gathered, encrypted and digitally signed needs further explanation. Bearing in mind that PKI cryptography is used in the preferred embodiment of the invention, this means that careful consideration needs to be given to the availability of the authorities private key. The private key is used to encrypt data, as well as to create the above-mentioned Digital Signature (see Table 1, item [13]). We now consider the following possible implementations (where encryption implies both data encryption, as well as creating the data's digital signature) at the Port of Entry—listed by decreasing risk of potential abuse:

4.1.1) Encryption at each immigration personnel's computer/workstation. This would require a copy of the private key to be distributed to every immigration personnel's computer/workstation. The risk for misuse is highest in this scenario. Each immigration personnel's computer/workstation would have to be sufficiently powerful enough to handle the encryption process in a relatively short period.

4.1.2) Encryption at a central computer server located in each Port of Entry, which serves the multiple immigration personnel computers/workstations (see [4.1.1] above). This would require a copy of the private key to be distributed to every central computer server located in each Port of Entry. The risk for misuse is relatively high in this scenario, but much lower than in case [4.1.1] above. The misuse risk can be mitigated by strict control of access to the Port of Entry's central computer server. Furthermore, the Port of Entry's central computer server processing power would have to be much larger than the above mentioned scenario, because of the aggregation of processing for multiple immigration personnel computers/workstations at the Port of Entry. The immigration personnel computers/workstations would have to be securely networked to the Port of Entry's central computer server.

4.1.3) Encryption at a central computer server located in each region of the customs and immigration service, which serve multiple Ports of Entry (see [4.1.2] above). This would require a copy of the private key to be distributed to every central computer server located in each service region. The risk for misuse is much lower in this scenario, than in both of the above cases (see [4.1.1] and [4.1.2] above). The misuse risk can be mitigated further by strict control of access to the service region's central computer server. The problem in this scenario is that the card 400 data (i.e. Table 1) would have to be sent to the service region's central computer server for encryption, etc. This would require a highly available and secure communications network between the various Ports of Entry and the service region's central computer server. Furthermore, the service region's central computer server processing power would have to be much larger than the above mentioned scenarios, because of the aggregation of processing for multiple Ports of Entry.

4.1.4) Encryption at a central computer server located in single location of the customs and immigration service, which serves multiple service regions (see [4.1.3] above). This would require a single copy of the private key to be distributed on the single central computer server. The risk for misuse is lowest in this scenario, compared to all of the above cases. The misuse risk can be mitigated further by strict control of access to the single central computer server. The problem in this scenario is that the card 400 data (i.e. Table 1) would have to be sent to the single central computer server for encryption, etc. from all of the immigration personnel computers/workstations, from all over the country. This would require a highly available; secure communications network, and relatively large bandwidth, between the various Ports of Entry and the single central computer server. Furthermore, the service region's central computer server processing power would have to be much larger than all of the above mentioned scenarios, because of the aggregation of processing for all Ports of Entry. The single central computer server could be a supercomputer, a mainframe computer, or a cluster of mainframe computers, or a cluster of mid-size computers, etc.

The preferred embodiment implements option [4.1.3] above, i.e. encryption at a central computer server located in each region of the customs and immigration service, which serve multiple Ports of Entry. The card 400 data is transferred to the service region's central computer server, pertinently encrypted and digitally signed (i.e. created in "cryptographic state"), and then the data are returned in the cryptographic state to the immigration personnel's computer/workstation in order for a card 400 to be created and issued.

The finished card 400 product is preferably issued to the visitor at the point of entry, i.e. where all of the biometric data is gathered, etc. by the immigration official's workstation. Unfortunately because the process to print, load pertinent data into the card 400, as well as registering the data with the central database 2, could take many minutes of time, it may be better to issue the card 400 to the visitor at another point in the customs and immigration process. One possible point could be the customs checkpoint at the Port of Entry. All visitors to a country first pass through the immigration process. They then collect their luggage and proceed to customs. It usually takes more than twenty minutes for the luggage to appear. Consequently, this invention proposes to use the customs checkpoint to issue, i.e. hand over, each visitor's card 400.

Once the visitor has been cleared by the customs and immigration officials, he enters the country with his Visitor- Visa Card 400 in-hand. An explanation is given to the visitor, e.g. via a pamphlet, regarding the use and relevance of the card 400.

4.2) Losing a Visitor-Visa Card

If the card 400 is lost, then the visitor must immediately report its loss and go to the nearest immigration office to generate a new card 400. In this process, the visitor would have to pay for a new card 400. At the time that the loss is reported, the central database 2 would be updated that the card 400 is no longer valid, i.e. the Visitor-Visa Card Number 403 is invalid and the visitor is scheduled to obtain a new card 400.

The visitor would be photographed and fingerprinted again, as he originally was at the Port of Entry (block 20 in FIG. 2). The visitor's new digital photo and fingerprint images are first compared with those stored in the central database 2, that were inputted during the process of "Initialization At Port of Entry" (block 20 in FIG. 2). If the images match, then a new card 400 is generated for the visitor and his central database 2 record is updated. Note that the originally issued card's identification data remains in the central database 2, but is tagged as "lost". The reason for this is in the advent that the stolen card is fraudulently used, it can be detected and the thief apprehended. If the card 400 is returned, the database 2 is updated, but a record is still kept of the card 400 theft in case fraudulent use is made of the data on the card 400. Sometimes it may be feasible to simply retire the stolen card 400 from circulation, even if it is returned to authorities.

4.3) Time to Check in—Block 21 in FIG. 2

At some predetermined time interval, e.g. every month from the date of arrival in the country, the visitor must check-in at a local immigration office, or at a place, that has a Visitor-Visa ATM 1 available. As mentioned previously, the visitor can use the phone contact information 405 that is printed on the front face of the card 400 to locate where the nearest ATM 1 is located.

Although not illustrated, the preferred embodiment of the invention uses a common telecommunications technique, which is based on a telephone's caller-id. The number that the visitor dials, per the contact phone number 405, is implemented using an Interactive Voice Response (IVR) computer system. Firstly, the visitor is prompted to enter his card identification number 403 using the keypad on the phone. The number 403 is used to access the central database 2 to find out what is the visitor's preferred language, or languages. This language is then used to issue all further instructions, etc.

The IVR computer recognizes from where the call is placed, and if the appropriate menu option is selected (e.g. "Where is the nearest ATM location?"), the system tells the visitor where the nearest Visitor-Visa ATM 1 is located.

The preferred embodiment provides this information via the Internet as well (e.g. on a web site, which is not illustrated). This step in the process is illustrated by the "Locate Visitor-Visa ATM in City", block 22 in FIG. 2.

Note that it is preferable for the ATM 1 to be in a secure location to prevent vandalism and other abuses of the system. Examples of such locations are as follows:

(4.3.1) Local government offices, e.g. immigration office, etc.
(4.3.2) Select local police stations that are located in public areas.
(4.3.3) College campus police stations.
(4.3.4) Airport locations, e.g. monitored by the US Transportation Security Administration.

The visitor then goes to the nearest Visitor-Visa ATM 1 and takes his Visitor-Visa card 400 along with him. Note that at this stage the visitor does not need his passport and hence can leave it stored securely at his hotel, etc.

4.4) Check in with Visitor-Visa ATM—Block 23 in FIG. 2

Before continuing with the detailed description of this step in the process, a note needs to be made regarding the various data storage implementation methods of the Visitor-Visa card 400, as mentioned above in the section titled "4.1) Initialization At Port of Entry". In this section, it was mentioned that identification information about the visitor (i.e. Table 1) is stored in one of two technologies, i.e. a smart-chip 401 and/or a magnetic stripe 406. Because of the previously mentioned physical data storage limitations of the magnetic stripe 406, the preferred embodiment of the invention implements data storage on the card 400 in a smart-chip 401.

On the other hand, if a smart-chip 401 implementation is not used, then this information would be retrieved from the central database 2. This is done by retrieving the visitor's record in the central database 2, using the secure network 10 and the card identification number 403. This record contains the original copy of all of the pertinent identification information about the visitor that is listed in Table 1.

After locating the nearest Visitor-Visa ATM 1, the foreign visitor approaches the ATM 1 with his Visitor-Visa Card 400 in-hand.

Note that the Visitor-Visa ATM 1 could be monitored by video cameras to deter vandalism, etc.

The ATM 1 has markings (not illustrated in FIG. 1) as to where the person needs to stand in order to appear correctly within the focal length of the Visitor-Visa ATM's digital camera 3. The person then enters his card 400 into the ATM's card scanner 7.

The data retrieved from the visitor's card 400 is temporarily stored in the ATM's memory 4 for processing purposes, as well as along with the date and time of the transaction, as well as the geographic location of the Visitor-Visa ATM 1. Note that the geographic location of the Visitor-Visa ATM 1 could simply be implemented as a device id, which the central database 2 then translates into the known geographic location.

The ATM's CPU 6 next verifies that the visitor's card 400 has a valid digital signature (see Table 1, item [13]). If the digital signature is invalid, then the CPU 6 notes this information as part of the temporarily stored data record of the visitor in memory 4. The reason for this is that further validation of the person's identity is required, i.e. via a digital fingerprint scan and a digital photo.

Note that at no time does the invention forewarn the visitor of any problems. The reason for this is not to alarm the visitor before more data is gathered, etc.

The ATM 1 retrieves the language (See Table 1, item [10]) in which the visitor prefers to communicate. The CPU 6 retrieves the relevant language menus that are pre-stored in the ATM's memory 4. The reason for this is obvious, i.e. to minimize any potential communications problems with the visitor regarding any conveyed instructions, etc. Note that it is possible for the invention to simply store in memory 4, say the English menu system, and then to programmatically translate to the visitor's preferred language. The preferred embodiment of the invention uses the simpler method of pre-storing menus in all of the accepted foreign languages. This reduces the need and expense for today's relatively sophisticated language translation software to be embedded in the ATM 1.

The first message to appear on the ATM's display 8 is for the visitor to remove any headgear, sunglasses, etc. that could interfere with the facial identification of the person. Next, the person is informed that a photo will be taken. Preferably, a countdown indicator is displayed on the display 8 informing the visitor of the imminent photo taking.

After the digital photo has been taken, then the visitor is prompted via the ATM's display 8 to place his pertinent finger on the surface of the digital fingerprint scanner 5. His fingerprint is digitally scanned in and temporarily stored in memory 4.

For the casual visitor to the country, this would suffice for the check-in process. On the other hand, if the visitor is say a student, then other information could be asked to be verified by the visitor, for example, the visitor's current residential address, place of study, etc. (i.e. in "Other Data", Table 1). If any information has changed, a touch-screen keyboard is displayed on the display 8, and the visitor is prompted to enter the correct information. Other examples of longer-term foreign visitors are temporary workers, visiting academics, political refugees, etc.

Once the visitor has submitted all of his required information, the visitor's temporary data record stored in the ATM's memory 4, is sent to the central database 2, via a secure network 10. In FIG. 2, this step in the process is identified as "Log Visit in Central Database", block 101.

A program at the central database 2 then processes the received information by comparing all the pertinent data (see Table 1) with a copy of the visitor's identification data (i.e. in Table 1), which was originally stored in the central database 2 at the time that the visitor's card 400 was created and issued.

The next step in the check in process is depicted in block 25 in FIG. 2, i.e. the "All's Well?" symbol. The following scenarios are possible:

4.4.1) If a problem is encountered, e.g., the visitor's digital fingerprint does not match the original fingerprint that was scanned in at the Port of Entry, then a pertinent anomaly message is returned to the Visitor-Visa ATM 1. The ATM 1 then informs the visitor via the display unit 8, that he needs to visit, in person, the nearest Customs and Immigration office within a specified time-period. This step is depicted by the "Visit Visitor-Visa Office", block 80 in FIG. 2. The Visitor-Visa office location is displayed to the visitor on the display 8, and the ATM's integrated printer 11 prints the location and the specified time-period out for the visitor on a piece of paper 12. The visitor's central database 2 record is tagged as problematic, with the appropriate code, as well as any other pertinent data.

4.4.2) On the other hand, it is possible that authorities have tagged the visitor's central database 2 record as "need to apprehend". In this case, a message is communicated to the nearest law enforcement authorities to proceed immediately to the location of visitor's ATM 1 location. Another message code is transmitted to the Visitor-Visa ATM 1 to stall the person. The stall process could entail asking many other seemingly related questions, as well as displaying other information. Once again, the visitor's central database 2 record is tagged as problematic, with the appropriate code, as well as any other pertinent data.

4.4.3) For most visitors, no problems would be encountered. The Visitor-Visa ATM 1 would then calculate when the visitor next needs to check in, provided he does not leave the country prior to the calculated date. As mentioned previously above, this information is displayed to the visitor on the display unit 8, and if a printer is available, a note 12 is printed for the visitor in his preferred language (see Table 1, item [10]).

Other possible "All's Well?" scenarios could exist, and even though they are not described here, they are not excluded from the present invention.

4.5) Data Mining of the Central Database

The information stored in the central database 2, including the check-in events of the foreign visitor, can be searched (i.e. mined) by various authorized computer programs. We now consider a number of these processes:

(4.5.1) Check for Unusual Behavior—Block 201 in FIG. 2:

A computer program 201 runs constantly checking for unusual behavior 200 patterns in the data collected in the central database 2. Unusual behavior would simply imply searching for anomalies such as fraudulent use of a particular Visitor-Visa Card 400, or a visitor's overstay. In the fraud case, it could be that a person simply copied all the information from one card 400 to another card. This behavior could be detected on a number of levels:

a. The same Visitor-Visa Card Number 403 is present on the smart-chips of both Visitor-Visa cards.

b. The encrypted digital images (i.e. fingerprint and/or photo) that is stored in the central database 2 is not the same as that captured at check in time by the ATM's digital camera 3, or digital fingerprint scanner 5.

Common fraudulent document detection methods would apply to this program 201, but are not explicitly discussed here.

Other uses 300 (see FIG. 2) of the central database 2 by authorized parties include:

(4.5.2) If the visitor were pulled over by police 301 (see FIG. 2), say for speeding, then the police officer would scan 399 the visitor's Visitor-Visa card 400 on equipment supplied to the police authorities (not shown in FIG. 2). The visitor's information would then be logged and checked 102 in the central database 2. If any anomaly is discovered, or the visitor's central database 2 record has been tagged, the police officer can take the appropriate action.

(4.5.3) The Visitor-Visa card 400 check in process could be modified and used in other circumstances during the visitor's visit. For example, the card 400 can be scanned whenever the visitor checks into a hotel, or rents a car, or travels by rail, etc. (see block 302 in FIG. 2). Supplying this information could help in various ways, including for routine crime reduction. An example of routine crime reduction could be in the advent that a visitor's wallet was stolen in which his credit cards and identification documents were located. The visitor would report the theft to the relevant authorities, including the Visitor-Visa card 400 authorities (see above section titled "Losing a Visitor-Visa Card"). The thief would then have to use the Visitor-Visa card 400 whenever he'd use, e.g. a credit card within the country. This process would need the possible process modification by the credit card companies, such that if a credit card is used, and the number belongs to an overseas visitor, then the visitor's Visitor-Visa card 400 would have to be scanned as well.

4.6) Check Out at Port of Exit—Block 110 in FIG. 2

When the visitor is ready to leave the country, he needs to check in one last time with a Visitor-Visa ATM 1. This time, the ATM 1 is located within the exit process implemented by the country's customs and immigration authorities, i.e. at the Port of Exit (e.g. at airports, seaports, etc.).

The check out process is similar to that outlined in the above section titled "Check In With Visitor-Visa ATM" (Block 23 in FIG. 2), with the following exception: the visitor's card 400 is "swallowed" by the Visitor-Visa ATM 1, i.e. it is not returned to the visitor.

This card 400 "swallow" process does not apply to certain visa types, i.e. types that are authorized for long-term stay in the country and have not overstayed permitted time in the country. In the US, examples of these visa types include:

A visa—Diplomatic and other government officials, and their families and employees.

G visa—Representatives to international organizations and their families and employees.

J visas—Exchange Visitors and their families.

H-1B visas—Persons in a specialty occupation, which requires the theoretical and practical application of a body of highly specialized knowledge requiring completion of a specific course of higher education.

L visas—Intra-company transferees who, within the three preceding years, have been employed abroad continuously for one year, and who will be employed by a branch, parent, affiliate, or subsidiary of that same employer in the U.S. in a managerial, executive, or specialized knowledge capacity.

I551—US permanent residents, i.e. "green card" holders.

Numerous other immigrant and non-immigrant visa classifications apply as well, but are not listed here.

The visitor's central database 2 record is updated accordingly.

At check out, the visitor's central database 2 record is checked for any anomalies before the visitor is allowed to exit the country.

Once the card 400 has been returned to the authorities at check out, the visitor related data on the card 400 is erased and it is now available to be reused with a new visitor entering the country.

In the case where the card 400 is not "swallowed", on re-entry to the country, the cardholder goes through a similar process as to the one detailed in the section titled "Check In With Visitor-Visa ATM" (Block 23 in FIG. 2). The difference in this case is that the check-in process is via the immigration authority at a Port of Entry. The same validation tasks are undertaken to ensure that the cardholder is correctly listed in the database 2.

What is claimed:

1. A distributed customs and immigration system for authorizing a visitor's stay in a country, comprising:
   a) a smartcard;
   b) a plurality of first computers comprising:
      i) a means for capturing a plurality of first biometric data from said visitor,
      ii) a means for entering first textual data,
      iii) a means to communicate in a multiplicity of foreign languages on said first computers, wherein said visitor selects a preferred visitor language to communicate with said first computers, from said multiplicity of languages,
      iv) a means to translate said first textual data from said multiplicity of foreign languages to a first language used by said visited country, said translation of said first textual data are second textual data;
      v) a means for storing said first biometric data and said second textual data on said smartcard;
   c) a first computer server remotely located from said first computers comprising:
      i) a first database system,
      ii) a plurality of programs for interacting with said first database system;
   d) a first communications network interconnecting said first computers to said first computer server;
   e) wherein said smartcard includes a first unique identifier;
   f) wherein said first computers store said first biometric data, said first textual data and said second textual data in said first database system located on said first computer server system using said first communications network;
   g) wherein said first textual data and said second textual data include information about said visitor's stay in said country.

2. The system of claim 1 wherein said smartcard comprising:
   a) a cryptographic circuit and memory, said memory storing said first biometric data and said second textual data;
   b) said first unique identifier visible on face of said smartcard;
   c) a magnetic stripe, wherein said magnetic stripe storing third textual data, said third textual data uniquely identifying said smartcard and said visitor;
   d) said preferred visitor language selection stored in said memory.

3. The system of claim 1 wherein said first biometric data selected from the group consisting of a fingerprint and a photograph.

4. The system of claim 1 wherein said first communications network comprising a secure network.

5. The system of claim 1 wherein said first biometric data, said first textual data and said second textual data stored in said first database system is accessed using said first unique identifier.

6. The system of claim 1 wherein said means for entering first textual data is a touch screen computer display keyboard.

7. A distributed customs and immigration system for periodically identifying and validating a visitor's authorized stay in a country comprising:
   a) a smart card;
   b) a plurality of first self service computer terminals comprising:
      i) a means for capturing a plurality of first biometric data from said visitor,
      ii) a means for displaying information to said vistor,
      iii) a means for entering first textual data by said visitor,
      iv) a means for storing said first biometric data and said first textual data on said first self service terminals,
      v) a means to communicate in a multiplicity of foreign languages on said first self service computer terminals, wherin said visitor selects a preferred visitor language to communicate with said first self service computer terminals from said multiplicity of languages,
      vi) a means to translate said first textual data from multiplicity of foreign languages to a first language used in said visited country, said translation of said first textual data are second textual data;
   c) a first computer server remotely located from said self service terminals comprising:
      i) a first database system,
      ii) a plurality of programs for interacting with said first database system,
      iii) a third textual data store in said first database system, said textual data comprising data originally entered by said visitor about said authorized stay in said country;

d) a second communication network interconnecting said first self service computer terminals to said first computer server;
e) wherein said first self service computer terminals transfer said biometric data, said first textual and said second textual data to said first database system located on said first computer server using said second computer communications network;
f) wherein said first textual data and said second textual data include a change of information about said visitor's stay in said country, described by said third textual data comprising data originally entered by said visitor about said authorized stay in said country; and
g) wherein said first computer server programs compare said first biometric data received from said first self service computer terminals with said second biometric data originally entered by said visitor in an originating country.

8. The system of claim 7 wherein said smart card comprising:
   a) a cryptographic circuit and memory storing said second biometric data captured from said visitor in an originating country; and
   b) a first unique identifier code visibly imprinted on said smartcard and stored in said memory.

9. The system of claim 8 wherein said second biometric data and said third textual data stored in said first database system and said memory is accessed using said first unique identifier code.

10. The system of claim 7 wherein said first and said second biometric data selected from the group consisting of a fingerprint and a photograph.

11. The system of claim 7 wherein said second communications network comprising a secure network.

12. The system of claim 11 wherein said second communications network selected from the group consisting of X.25, dedicated telecommunication lines, satellite VSAT network and a virtual private network over the Internet.

13. The system of claim 7 wherein said means for entering said first textual data is a touch screen computer display keyboard.

14. A customs and immigration computer method system to authorize and to periodically identify and validate a visitor's authorized stay in a country, comprising the steps of:
   a) collecting first biometric data and other first data from said visitor with a first computer by an immigration authority;
   b) providing means to said visitor to enter said first data in a preferred visitor language, selected from a multiplicity of foreign languages from said first computer;
   c) translating said first data entered into said first computer from said preferred visitor language into second data, said second data in preferred language of said country.
   d) transferring said first biometric data, said first data and said second data from said first computer to a second computer using a first communications network, said second computer comprising a first database system;
   e) storing said first biometric data, said first data and said second data in said first database system;
   f) issuing a smartcard to said visitor, said smartcard comprising a first unique identifier. said first biometric data and said second data;
   g) instructing said visitor to cheek in with a first self service computer terminal by a predetermined date, said first self service computer terminal located in a plurality of locations in said country;
   h) connecting said self service computer terminal to said first database using a second communications network;
   i) using said smartcard to check in with said first self service computer terminal;
   j) accessing said first database system by said self service computer terminal, using said first unique identifier, said first unique identifier read from said smartcard;
   k) validating said visitor by collecting second biometric data using said first self service computer terminal, said validating comprising transferring said second biometric data to said first database system and comparing said second biometric data with said first biometric data stored in said first database system;
   l) entering changed data from said first data, storing said changed first data in said first database system as third data;
   m) translating said third data to fourth data, said fourth data in said preferred language of said country;
   o) storing said fourth data in said first database system;
   p) using said smartcard in said country as an identity document;
   q) checking for unusual use of said identity document in said country using said first database system;
   r) returning said smartcard to said immigration authority at end of said authorized stay in said country.

15. The system of claim 14 wherein said second biometric data selected from the group consisting of a fingerprint and a photograph.

16. The system of claim 14 wherein said second communications network comprising a secure network.

17. The system of claim 14 wherein said second communications network selected from the group consisting of X.25, dedicated telecommunication lines, satellite VSAT network and a virtual private network over the Internet.

18. The system of claim 14 wherein said first biometric data and said first data stored in said first database system is accessed using said first unique.

19. The system of claim 14 wherein said identity document use includes a hotel check-in, an airline travel check-in, a rail travel check-in, a car rental transaction, a police vehicle check and a credit card transaction.

20. The system of claim 14 wherein said unusual use of said identity document in said country includes fraudulent copying and use of said smartcard.

* * * * *